United States Patent

Otaka et al.

[11] Patent Number: 5,313,471
[45] Date of Patent: May 17, 1994

[54] ERROR CONCEALING METHOD

[75] Inventors: Hideki Otaka, Neyagawa; Masakazu Nishino, Kashiwara; Tatsuro Juri, Osaka, all of Japan

[73] Assignee: Matsushita Electric Industrial Co., Ltd., Tokyo, Japan

[21] Appl. No.: 840,756

[22] Filed: Feb. 24, 1992

[30] Foreign Application Priority Data

Feb. 26, 1991 [JP] Japan .................................. 3-30639
Oct. 23, 1991 [JP] Japan ................................. 3-275160

[51] Int. Cl.⁵ .......................... G06F 11/00; H04L 1/00
[52] U.S. Cl. ........................................ 371/31; 358/310
[58] Field of Search .......................... 371/31, 38, 37.1; 360/33.1, 38.1; 358/314, 336, 394, 310

[56] References Cited

U.S. PATENT DOCUMENTS

| | | | |
|---|---|---|---|
| 4,329,708 | 5/1982 | Yamamoto et al. | 358/36 |
| 4,517,600 | 5/1985 | Reitmeier | 358/314 |
| 4,525,839 | 6/1985 | Nozawa et al. | 371/38 |
| 4,736,238 | 4/1988 | Moriyama et al. | 358/314 |
| 4,742,519 | 5/1988 | Abe et al. | 371/38 |
| 4,799,113 | 1/1989 | Murakami | 360/32 |
| 5,023,710 | 6/1991 | Kondo et al. | 358/133 |
| 5,068,744 | 11/1991 | Ito | 358/310 |
| 5,109,451 | 4/1992 | Aoro et al. | 382/56 |
| 5,193,010 | 3/1993 | Juri et al. | 358/336 |

Primary Examiner—Robert W. Beausoliel, Jr.
Assistant Examiner—Joseph E. Palys
Attorney, Agent, or Firm—Wenderoth, Lind & Ponack

[57] ABSTRACT

A record unit of coded video data is concealed. The record unit is reproduced from a recording medium and has a first recording block containing a part of a coded video data A which has been obtained by coding m blocks of video data among a plurality of blocks of video data divided from video data of one page, a second recording block containing a part of a coded video data B which has been obtained by coding other m blocks of video data among the plurality of blocks of video data and a third recording block containing in a first part thereof the remaining part of the coded video data A and in a second part thereof the remaining part of the coded video data B. The record unit also contains an address data indicating an address of a border of the first and second parts of the third recording block. The record unit of the coded video data is concealed by detecting an error position where an error of coded video data exists in the record unit, detecting the address data contained in the record unit, comparing the detected address data with an address data contained in a corresponding record unit of a previous page, and determining which part of the record unit should be replaced by a corresponding part of the corresponding record unit of the previous page according to the error position and a comparison result. The part of the record unit thus determined is replaced by a corresponding part of the corresponding record unit of the previous page to thereby conceal the record unit.

16 Claims, 13 Drawing Sheets

# ERROR CONCEALING METHOD

BACKGROUND OF THE INVENTION

1. Field of the Invention

This invention relates to an error concealing method of concealing uncorrectable errors when reproducing in a digital signal recording and reproducing apparatus.

2. Description of the Prior Art

A digital signal recording and reproducing apparatus for converting a video signal into a digital signal for record and reproduction corrects errors generated during reproduction based on error correcting parity added during recording. The digital signal recording and reproducing apparatus uses an error correcting code. However, for example, in event that a large scar is formed on a tape or when special effects are to be carried out such as slow and high speed play, the reproducing error rate is substatially increased, resulting in errors which cannot be corrected during the error correcting code. In such cases, an error concealment is applied to a detected error.

Error concealment of a video signal is realized by a method of interpolating from adjacent data or substituting data of an immediately preceeding frame, or the like. Here, in the case of using a bit rate reduction encoding in block units such as orthogonal transformation and the like, one error may have an expensive influence on all blocks so that it becomes difficult to conceal the error by interpolating from an adjacent data, and the error concealment is effected by substituting data of the corresponding block of a preceeding frame. In addition, in the case of using such a variable length coding as to finish with a plurality of blocks as a coding method, a variable length code fails to be synchronized with a word due to error when decoding, which means that such one error may have an expensive influence on a plurality of blocks. As a result, after decoding of an encoded data, an erroneous block has to be concealed. This means that a large-scale memory of one page or more is required for the concealment after decoding of an encoded data.

On the contrary, in case of concealing under the bit rate reduction encoded condition, a memory capacity for the concealment use may be made small. However, the concealment is required to be performed so as to correctly decode a variable length code when a concealed data is to be decoded. Accordingly, it is difficult to conceal an erroneous data under the encoded condition.

SUMMARY OF THE INVENTION

An object of this invention is to provide an error concealing method in which concealment is carried out under the bit rate reduction encoded condition so that a memory capacity necessary for concealment can be made small, degradation due to concealment can be decreased, and even after concealment, a variable length code can be properly decoded.

In order to attain the above-described object, an error concealing method of this invention is characterized in that an input sample value is blocked, and the data A and B which are respectively obtained by collecting the block thus obtained by blocking in an m by m blocks manner from one page having one field or a plurality of fields as a unit and being subjected to bit rate reduction encoding are divided into k recording blocks to be inserted thereinto. When an error when reproducing in case of performing a record with the k recording blocks as one recording unit is to be concealed, an error position and data construction of the recording unit of a current page are compared with a data construction of the corresponding recording unit of the page of one page before the current page to determine a concealing method of each of said data A and B constituting the recording unit of said current page. Each of the data A and B of the recording unit of the current page is then substituted with the data of the corresponding recording unit of the page of one page before the current page. In this manner, an error concealment is achieved.

With the method as shown above, one recording unit is formed of the data A and B which are subjected to bit rate reduction encoding and capable of being decoded independently to thereby perform recording. In concealing an error in the recording unit of the current page when reproducing, an error position and construction of the data A and B of the current page are compared with the construction of the data A and B of the corresponding recording unit of the page of one page before the current page to determine a concealing method of each of the data A and B, and each of them is substituted with the data of the corresponding recording unit one page before, and thus an error concealment is realized.

According to the above-described method, the error concealment under the bit rate reduction encoded condition makes it possible to decrease a memory capacity necessary for concealment, to reduce degradation due to concealment as well as to decode a variable length code properly even after concealment.

PREFERRED EMBODIMENTS OF THE INVENTION

Figure 1:
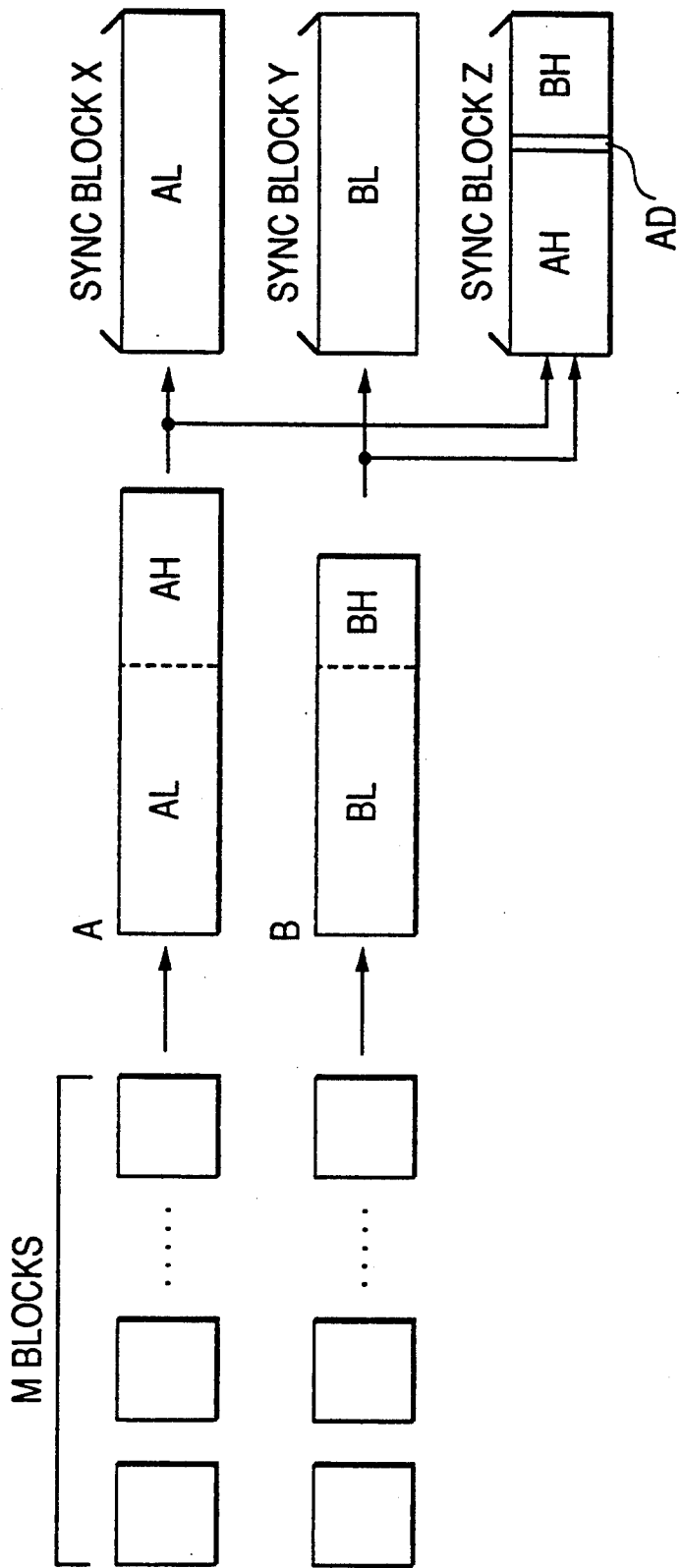
FIG. 1 is a block diagram for explaining a construction method of three recording blocks X, Y and Z and a data construction.

Preferred embodiments of this invention will be described below by referring to the drawings attached.

First, the data construction of one recording unit consisting of three recording blocks (sync blocks) will be explained. FIG. 1 illustrates an arrangement of three sync blocks X, Y and Z and a data construction. In FIG. 1, an input video signal is blocked, data A and B which are respectively obtained by collecting the block in an m by m blocks manner and being subjected to bit rate reduction encoding are divided into the three sync blocks X, Y and Z and inserted thereinto. As the bit rate reduction encoding, an orthogonal transformation and variable length coding are used. That is, a blocked data is decomposed into frequency components by the orthogonal transformation and subjected to the variable length encoding successively in the order from the low frequency component. As a result, the data A and B are different in data amount in accordance with the information amount of each block, and the variable length encoding is controlled so that the data amount obtained by summing up those of the data A and B can become constantly equal to the total data amounts of the three sync blocks.

In case of practically inserting data into the three sync blocks, first, the data corresponding to the low frequency component of the m blocks of the data a is inserted into the sync block X, and the data corresponding to the low frequency component of the m blocks of the data B is inserted into the sync block Y, which are expressed as AL and BL, respectively. Next, the data of the data A and B remaining which is not to be inserted into the sync blocks X and Y, that is, the data AH and BH corresponding to the high frequency components of the m blocks of the data A and B are inserted into the sync blocks Z, respectively. In this case, an address information (AD) is added at a predetermined position of the sync block Z so that the position where the data A and B are delimited can be clearly recognized when decoding because the sync block Z is made of the data AH and BH. Namely, the address information (AD) shows an address of delimiting the data AH and BH. Upon decoding, the data AH and BH are discriminated in accordance with the address information AD, and respectively added to the data AL and BL to be decoded.

Next, a method of concealing an error when reproducing in the case of being recorded by the method shown above will be explained below. For the sake of explanation, a current page where an error is generated is expressed as an (n+1)-th page and concealed data are shaded.

FIG. 2 illustrates an error concealing method according to a first embodiment of this invention. In FIGS. 2(a) and (b), because an error is generated in the sync block $X_{n+1}$, only the data Z is concealed.

Figure 2A:
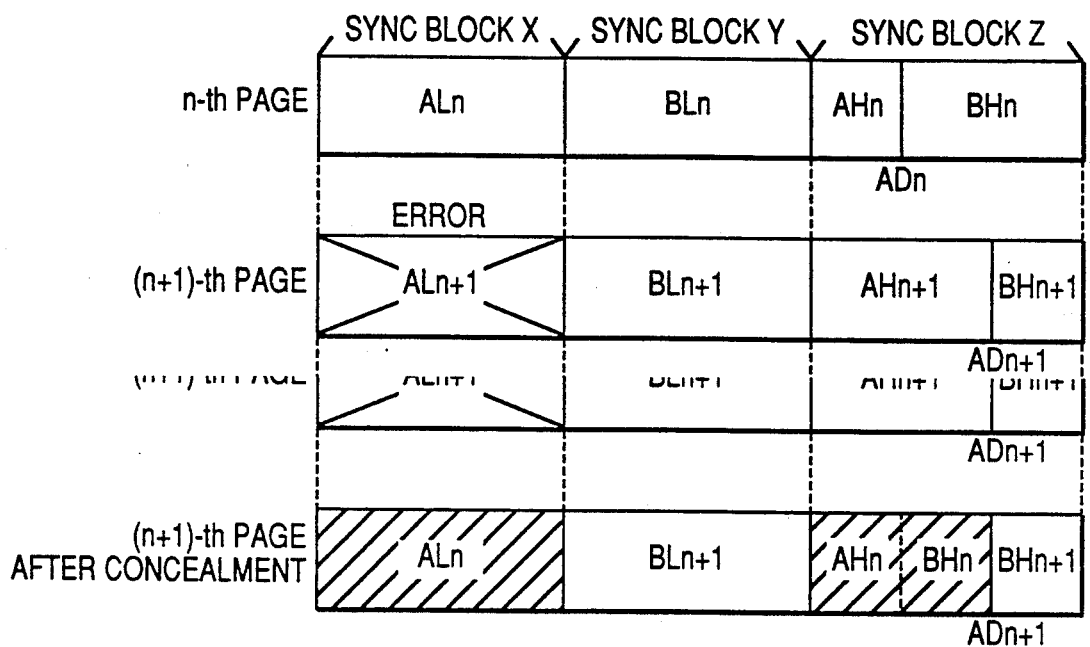
FIGS. 2(a), 2(b), 2(c), 2(d) are explanatory drawings of an error concealing method according to a first embodiment of this invention.

First, in FIG. 2(a), the data $AL_{n+1}$ of the sync block $X_{n+1}$ is substituted with the data $AL_n$ of the sync block $X_n$, and the data $AH_{n+1}$ of the sync block $Z_{n+1}$ is substituted with the data $AH_n$ of the recording block Z. Here, an n-th page and the (n+1)-th page are different in the address information AD from each other, but as the address information after concealment, an address information $AD_{n+1}$ of the current page is adopted. In the sync block Z after concealment, there exist both the data $AH_n$ and $BH_n$ before the address information $AD_{n+1}$, however, in the case of decoding a variable length code, by counting the number of EOBs (end of block), the end of the data $AH_n$ can be detected, so that no problem arises upon decoding.

Figure 2B:
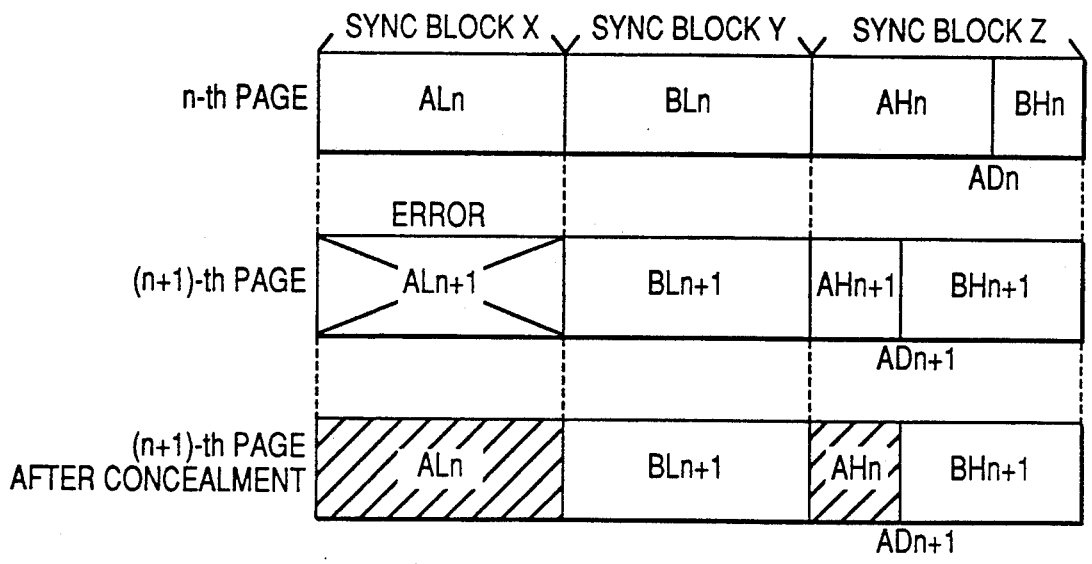

Next, in FIG. 2(b) which is different in data construction from FIG. 2(a), an error exists in the sync block $X_{n+1}$ similar to the case of FIG. 2(a), and the data $AL_{n+1}$ and $AH_{n+1}$ are concealed. In this case, in the sync block $Z_{n+1}$, if the data up to the address $AD_{n+1}$ of the current page is substituted with the data $AH_n$, a part of the high frequency component of the data $AH_n$ will be lost. In this case, however, such lost information are of the high frequency component of the original bloc, and image quality after concealment is not degraded to a large extent.

Figure 2C:
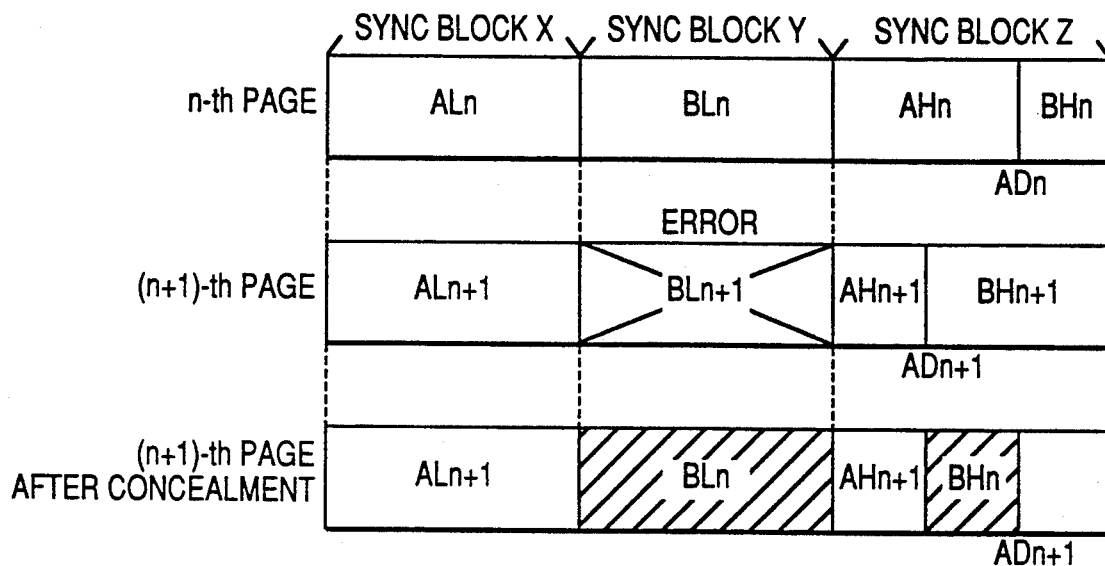

In FIGS. 2(c) and (d), an error exists in the sync block $Y_{n+1}$, and only the data B is concealed inversely to the case of FIGS. 2(a) and (b). First, in FIG. 2(c), the data $BL_{n+1}$ of the sync block $Y_{n+1}$ is substituted with the data $BL_n$ of the sync block $Y_n$, and the $BH_{n+1}$ of the sync block $Z_{n+1}$ is substituted with the data $BH_n$ of the sync block $Z_n$. Here, the n-th page and (n+1)-th page are different in address information from each other, but as the address information after concealment, the address information $AD_{n+1}$ is adopted.

Figure 2D:
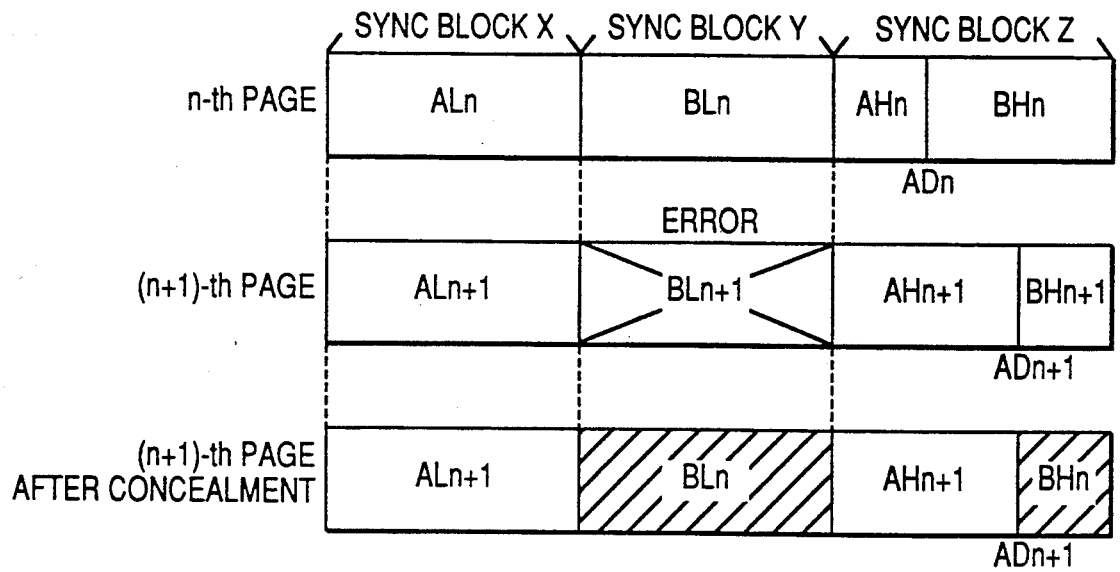

Next in FIG. 2(d) which is different in data construction from FIG. 2(c), an error exists in the sync block $Y_{n+1}$ similar to the case of FIG. 2(c), and the data $BL_{n+1}$ and $BH_{n+1}$ are concealed. As a result, in the sync block $Z_{n+1}$, if the data following the address $AD_{n+1}$ is substituted with the data $BH_n$ of the sync block Z, a part of the high frequency component will be lost. In this case, however, an image quality after concealment is not degraded to a large extent.

As described above, according to the first embodiment of this invention, due to the fact that the delimitation of the data A and B in the sync block Z after concealment is always shown by the address information AD, the data A and B after concealment can be decoded perfectly.

Figure 3A:
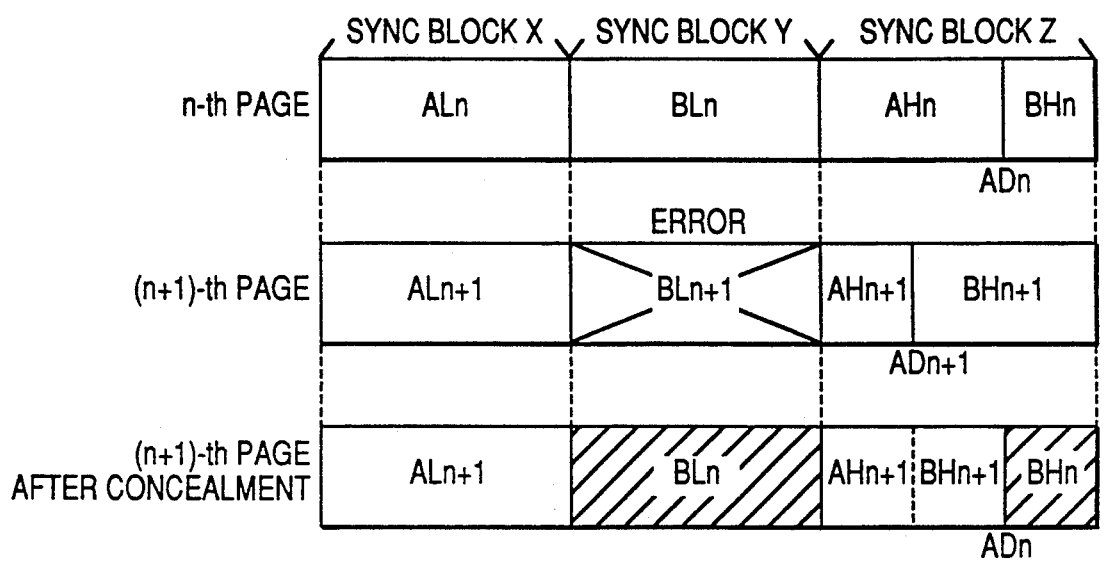
FIGS. 3(a), 3(b) are explanatory drawings of an error concealing method according to a second embodiment of this invention.

FIG. 3 illustrates an error concealing method according to a second embodiment of this invention. In FIGS. 3(a) and (b), an error exists in the sync block $Y_{n+1}$, and only the data B is concealed. First, in FIG. 3(a), the data $BL_{n+1}$ of the sync block $Y_{n+1}$ is substituted with the $BL_n$ of the sync block $Y_n$, and the $BH_{n+1}$ of the sync block Z is substituted with the data $BH_n$ of the sync block Z. As the address information after concealment, the address information $AD_n$ of the page of one page before the current page is adopted. In the sync block Z after concealment, there exist both the data $AH_{n+1}$ and $BH_{n+1}$ before the address $AD_n$ after concealment, however, similar to the case of FIG. 2(a), by counting the number of EOBs when a variable length code is decoded, the end of the data $A_{n+1}$ can be detected, so that there arises no problem when decoding.

Figure 3B:
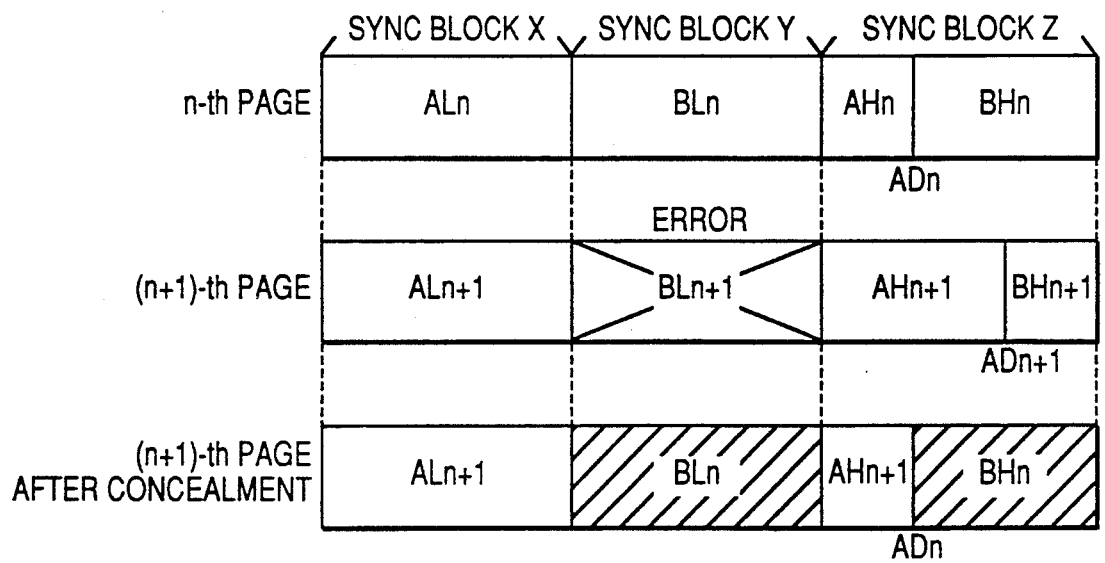

Next, in FIG. 3(b) which is different in data construction from FIG. 3(a), an error exists in the sync block $Y_{n+1}$ similar to the case of FIG. 3(a), and the data $BL_{n+1}$ and $BH_{n+1}$ are concealed. As a result, in the sync block $Z_{n+1}$, if the data following the address $AD_n$ of one page before is substituted with the data $BH_n$, a part of the high frequency component of the data $AH_{n+1}$ will be lost. In this case, however, an image quality is not degraded to a large extent.

As explained above, according to the second embodiment of this invention, in the case of concealing the sync block Z, by adaptively selecting the address information after concealment, the position of the data does not need shift, so that a concealment circuit can be made simple.

Figure 4A:
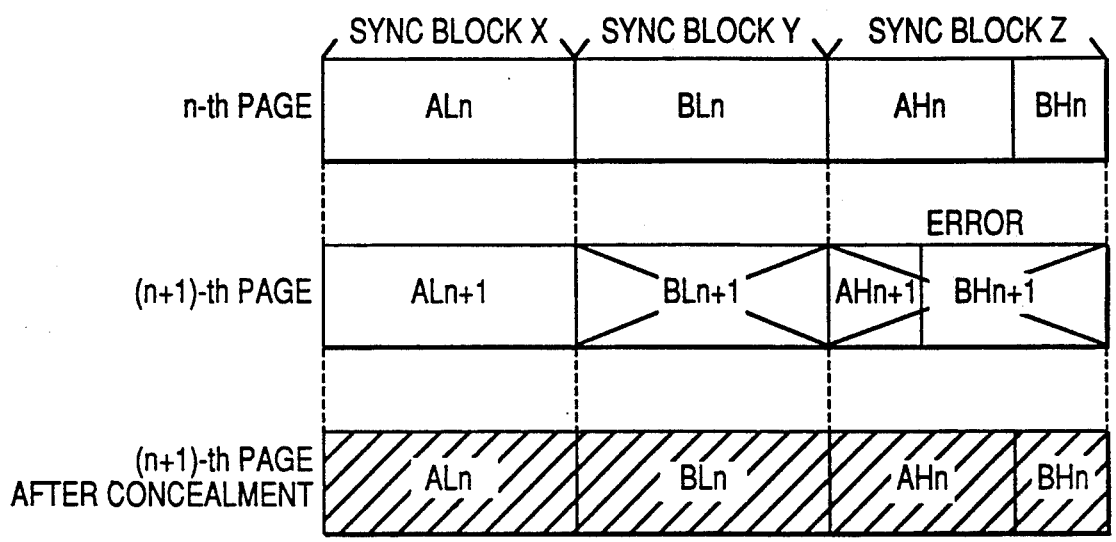
FIGS. 4(a), 4(b) are explanatory drawings of an error concealing method according to a third embodiment of this invention.
Figure 4B:
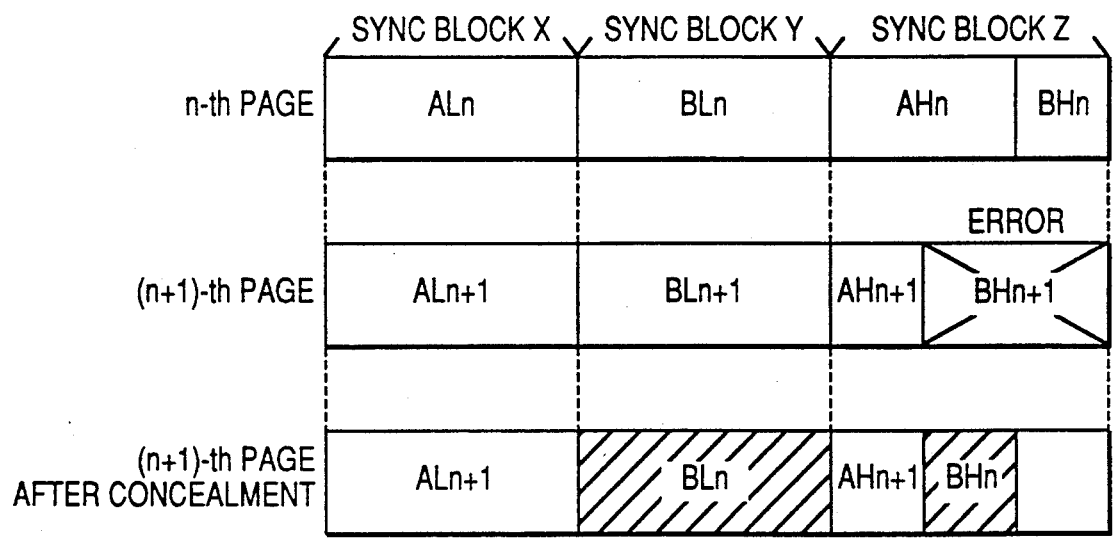

FIG. 4 illustrates an error concealing method according to a third embodiment of this invention. First, in FIG. 4(a), an error exists in the sync block $Z_{n+1}$, and the position where the error is existed is not clear, which means that it is not clear if the error is existed in the data A or the data B. As a result, only one of the data A and B cannot be concealed, so that the data of all the sync blocks $X_{n+1}$, $Y_{n+1}$ and $Z_{n+1}$ are substituted with the data of the recording blocks $X_n$, $Y_n$ and $Z_n$ in a respective manner. Next, FIG. 4(b) illustrates that an error exists in the sync block $Z_{n+1}$ similar to the case of FIG. 4(a) and the position where the error is existed can be discriminated. That is, the error can be discriminated to be existed in the data $BH_{n+1}$. As a result, the data $BL_{n+1}$ of the sync block $Y_{n+1}$ is substituted with the data $BL_n$ of the sync block $Y_n$, and the data $BH_{n+1}$ of the sync block $Z_{n+1}$ is substituted with the data $BH_n$ of the sync block $Z_n$. Also, in order to know the position where the error is existed in the sync block Z, not only an error flag in the sync block unit but also an error flag in the data unit are required.

Next, preferred circuit arrangements for realizing the error concealing methods explained above will be described below.

Figure 5:
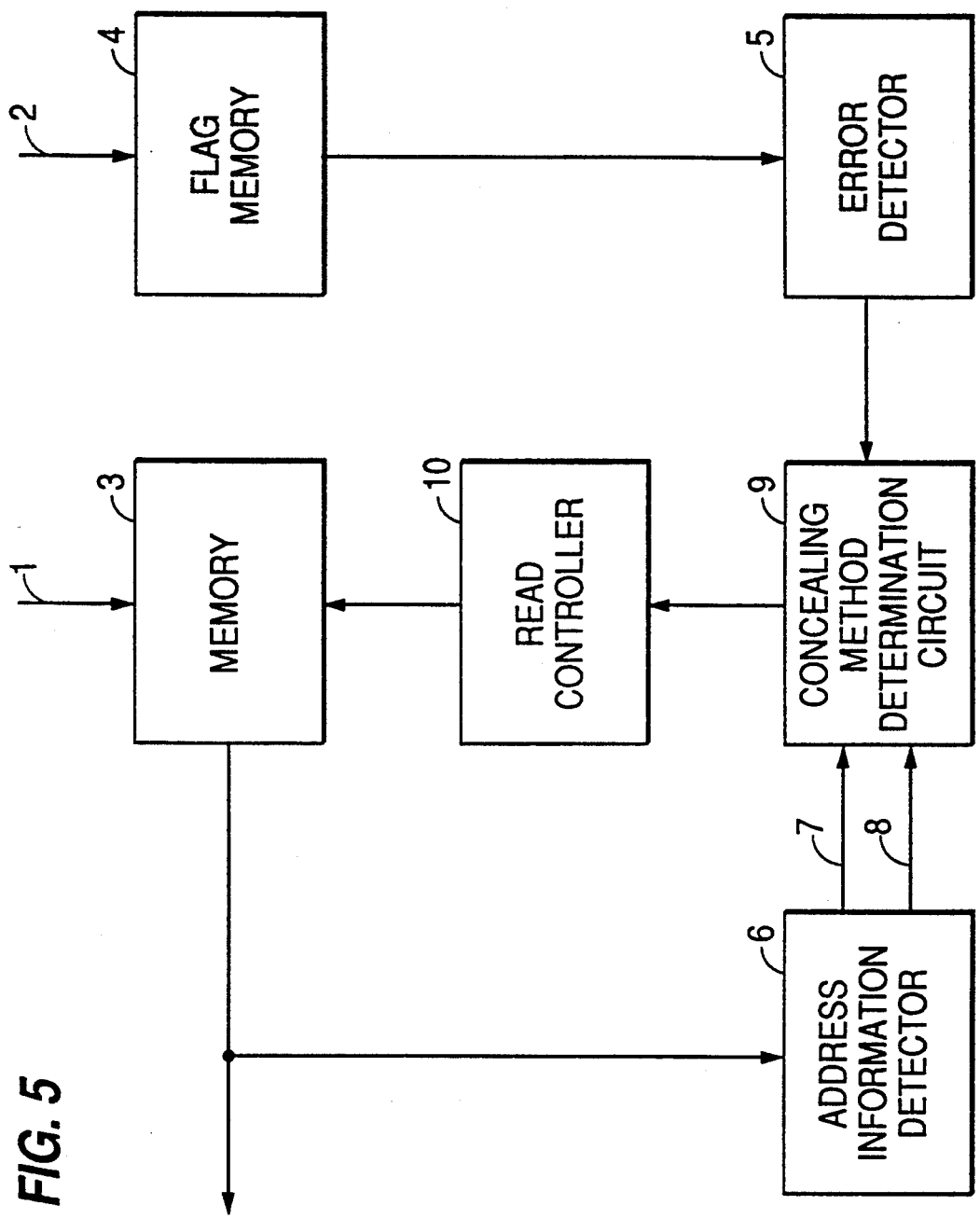
FIG. 5 is a block diagram of an error concealing apparatus for realizing an error concealing method of this invention.

FIG. 5 is a block diagram of an error concealing apparatus for realizing the error concealing methods shown above. In FIG. 5, the reference number 1 is a reproduced data, 2 is an error flag showing that each sync block is erroneous, 3 is a memory having a memory capacity of data amount for two pages, 4 is a flag memory for the error flag, 5 is an error detector for detecting an error in the recording unit, 6 is an address information detector for detecting an address information (AD) in the recording unit, 7 is an address information ($AD_{n+1}$) of a current page in the recording unit, 8 is an address information ($AD_n$) of the corresponding recording unit of the page of one page before the current page, 9 is a concealing method determination circuit for determining a concealing method in response to the detected results of the detector 5 and the address information detector 6, and 10 is a read controller for controlling reading the memory 3.

The memory 3 has a capacity of data amount for two pages, and consists of two ranges each having a capacity of data amount for one page, one range has the data of the current page having finished error correction and the other range has to the data of one page before the current page. In concealing the data of the current page, first, a sync block where an error is existed in the recording unit of the current page is detected by the error detector 5. Then, an address information multiplexed in the recording block Z for each of the current page and the page of one page before is detected by the address information detector 6. The error position and the address information thus detected by respective detectors are sent to the concealing method determination circuit 9 for determining a concealing method. In the case of reading the data from the memory 3, by controlling the read controller 10, if not concealed, the data is read out from the memory range of the current page, and if concealed, it is read out from the memory range of one page before the current page.

Figure 6:
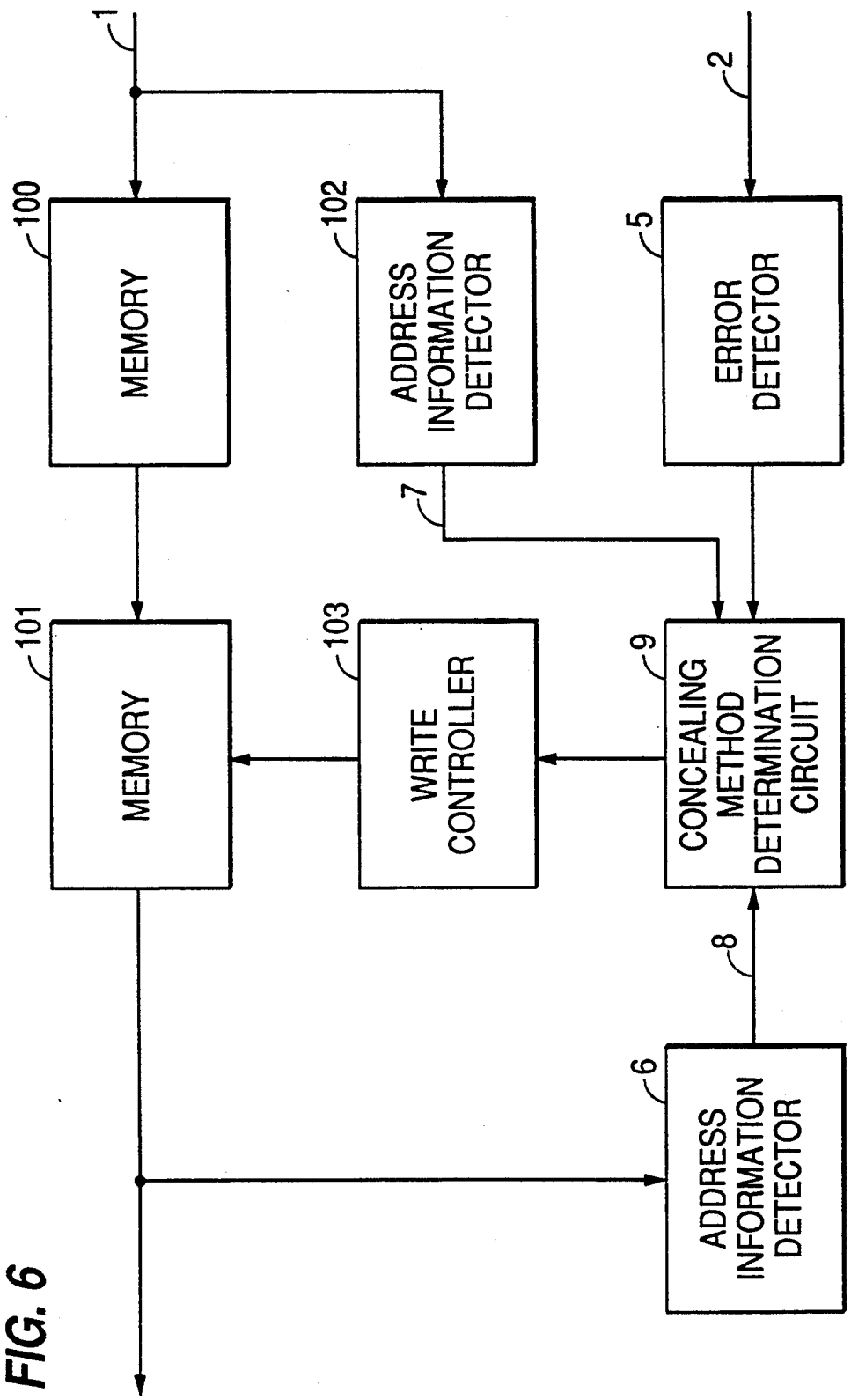
FIG. 6 is a block diagram of another error concealing apparatus for realizing an error concealing method of this invention.

FIG. 6 is a block diagram of another error concealing apparatus for realizing the error concealing methods already explained above. An explanation of those components of FIG. 6 having the dame reference numerals as those in FIG. 5 will be omitted. The reference number 100 is a memory having a memory capacity of data amount for three recording blocks, 101 is a memory having a memory capacity of data amount for one page of a sync block, 102 is an address information detector for detecting an address information (AD) of the recording unit of the current page, and 103 is a write controller for controlling writing the data into the memory 101 in response to the result of the concealing method determination circuit 9.

First, the memory 101 stores the data in every recording unit, and the detector 5 detects a position where an error is existed in response to an error flag 2 sent simultaneously with the data. Furthermore, the address information detector 102 detects an address information 7 multiplexed in the sync block Z. Then, the corresponding recording unit of one page before to the recording unit stored in the memory 100 is stored in the memory 101, so that a corresponding address information 8 of one page before is detected by the address information detector 6. The address information thus detected as above are sent to the concealing method determination circuit 9 for determining a concealing method. By controlling the write controller 103, if not concealed, the data is written into the memory, and if concealed, it is not written into the memory 101.

Figure 7A:
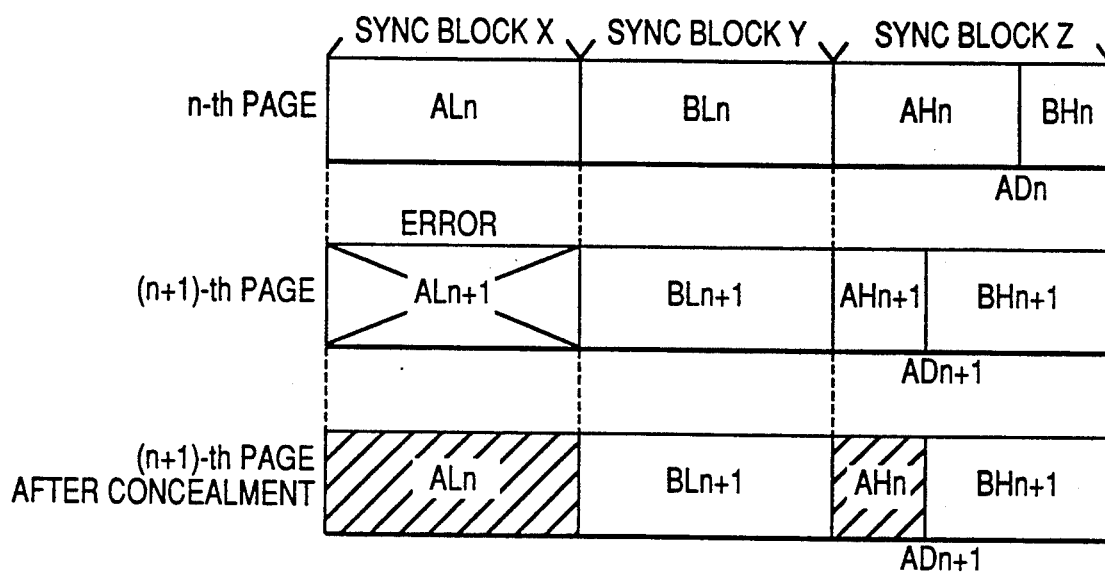
FIGS. 7(a), 7(b) are explanatory drawings of an error concealing method according to a fourth embodiment of this invention.
Figure 7B:
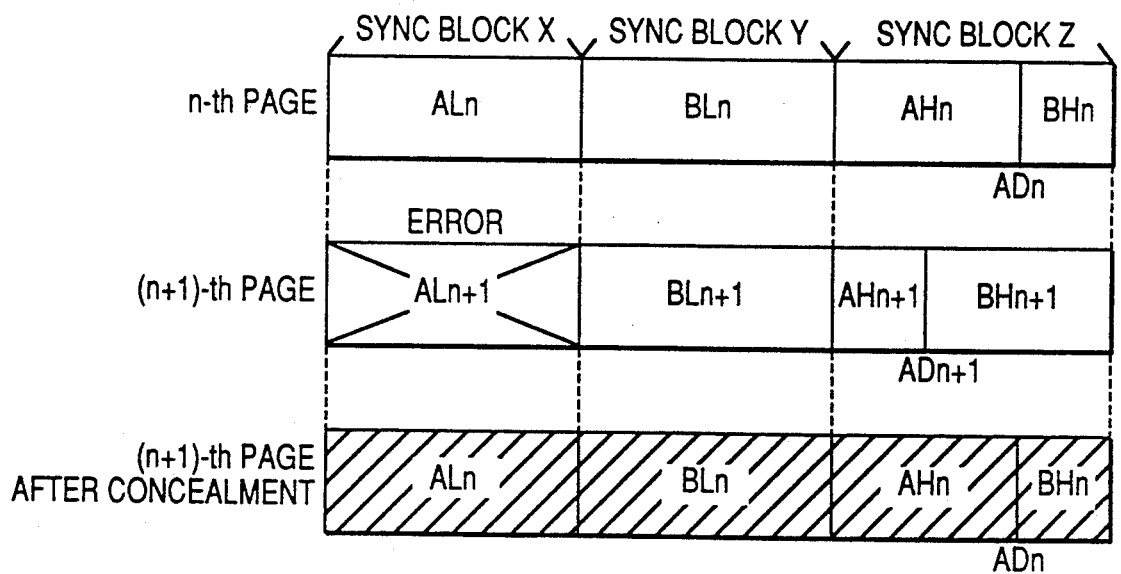

FIG. 7 illustrates an error concealing method according to a fourth embodiment of this invention. In this embodiment, an error exists in the recording block $X_{n+1}$, however, the concealing method is determined by comparing the address information of the current page with the address information of the corresponding recording unit of one page before. That is, as shown in FIG. 7(a), if the difference in address between the current page and the page of one page before is small, the data loss of the high frequency component of the data $AH_n$ becomes small, and only the data A is concealed. Next, as shown in FIG. 7(b), when the difference in address between the current page and the page of one page before is large, if only the data A is concealed, the data of the high frequency component thereof is largely lost and image quality degradation may be highly possibly generated, so that both the data A and data B are concealed.

Figure 8:
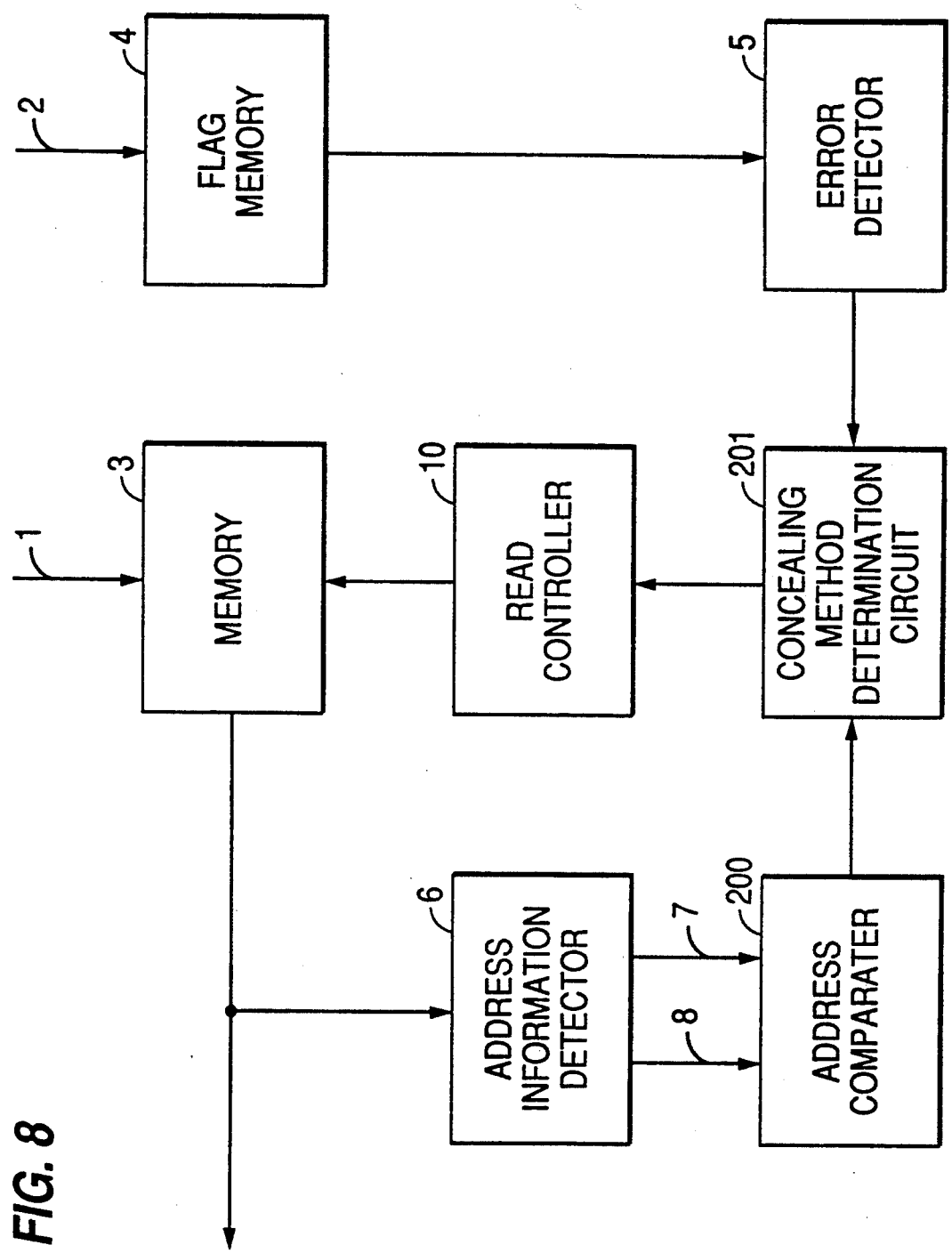
FIG. 8 is a block diagram of an error concealing apparatus for realizing the error concealing method of the fourth embodiment explained in FIG. 7.

FIG. 8 is a block diagram of an error concealing apparatus for realizing the error concealing method shown in FIG. 7. The arrangement of the apparatus shown in FIG. 8 is similar basically to that shown in FIG. 5. In FIG. 8, however, an address comparator 200 is additionally provided for comparing an address information of the recording unit of the current page with that of the corresponding recording unit of one page before. The address comparator 200 compares an address information ($AD_{n+1}$) 7 of the recording unit of the current page and an address information ($AD_n$) 8 of the corresponding recording unit of one page before, and outputs a difference in address thus compared to a concealing method determination circuit 201. The concealing method determination circuit 201 switches the concealing method in response to the result obtained by the address comparator 200 and a predetermined threshold.

As explained above, according to this embodiment, the data loss of the high frequency component by concealment becomes small, and image quality degradation due to concealment can be made small.

Figure 9:
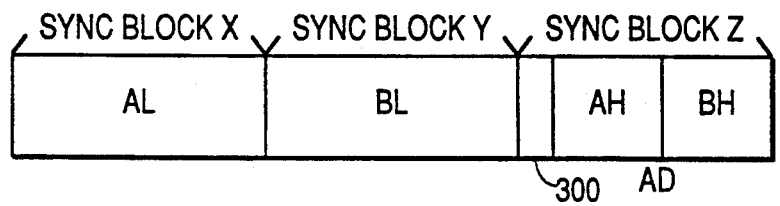
FIG. 9 is an explanatory drawing of a method of multiplexing a concealed information.

Explanations were made on the error concealing methods of this invention as shown above. In this case, however, in order to know whether or not the targeted recording unit is already concealed in the past, as shown in FIG. 9, if the error concealment was made, an information (concealment information) 300 showing the fact that concealment was made for the concealed recording block is additionally provided to each sync block, so that the concealment information 300 can be made as a discrimination item for new concealment.

Figure 10:
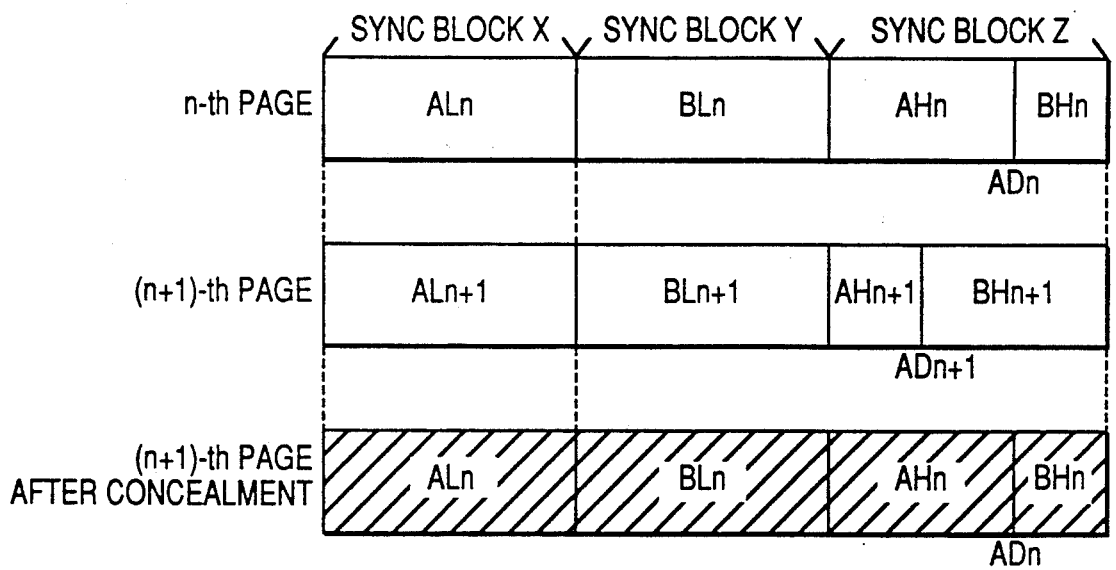
FIG. 10 is an explanatory drawing of an error concealing method according to a fifth embodiment of this invention.

FIG. 10 illustrates an error concealing method according to fifth embodiment of this invention. In FIG. 10, the concealment has been already made in the past for the recording unit of the page of one page before the current page. In this embodiment, an error exists in the sync block X. In this case, however, the recording unit of one page before has been already concealed in the past, so that the data of the high frequency component in the sync block Z may be already lost. That is, if concealment is made for only the data A of the current page, the data of the high frequency component will be further lost and image quality degradation may be made visible. As a result, when the recording block of the current page or the page of one page before has been already concealed, as shown in FIG. 10, all the data of one recording unit are concealed independently of the error position and the recording unit structure.

Figure 11A:
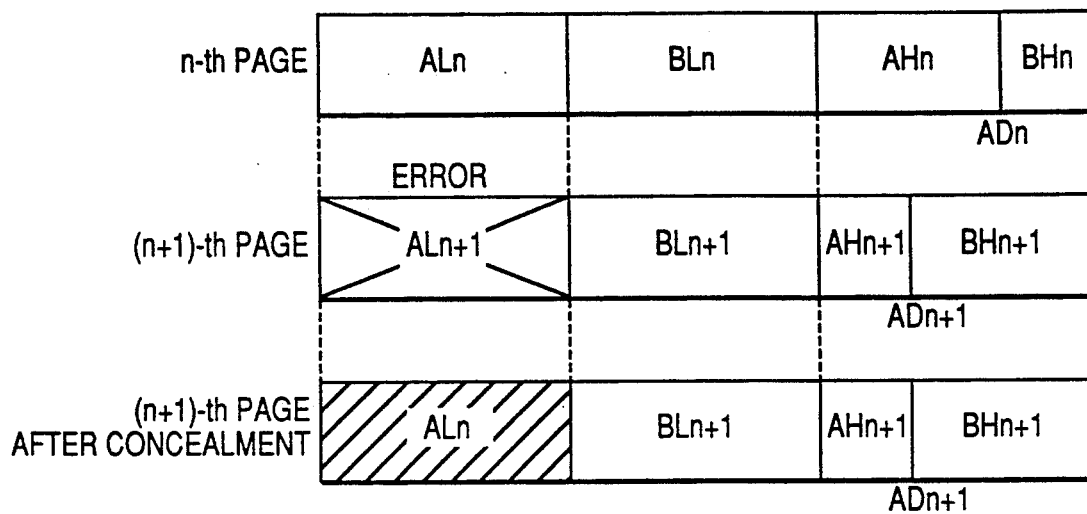
FIGS. 11(a), 11(b), 11(c) are an explanatory drawings of an error concealing method according to a sixth embodiment of this invention.
Figure 11B:
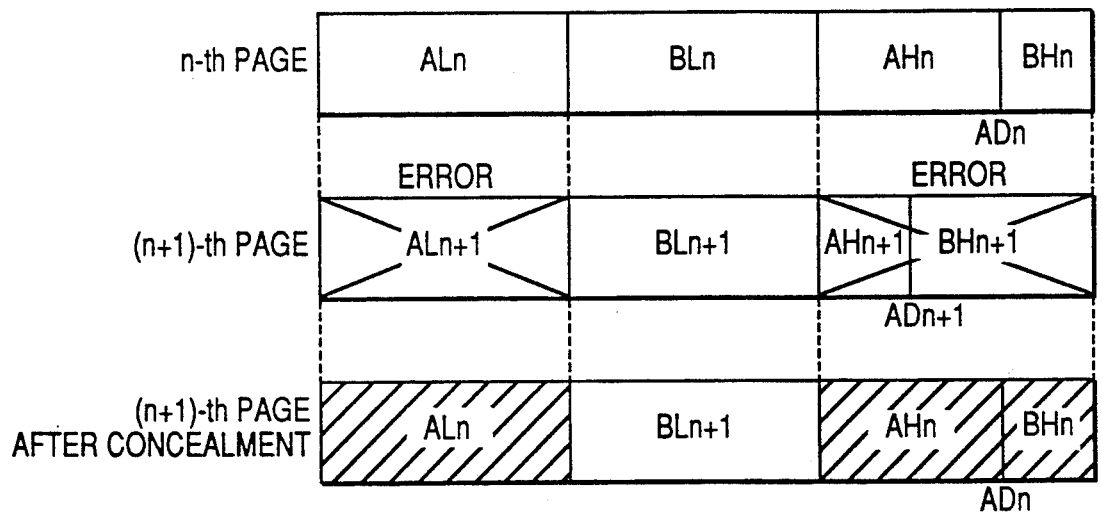
Figure 11C:
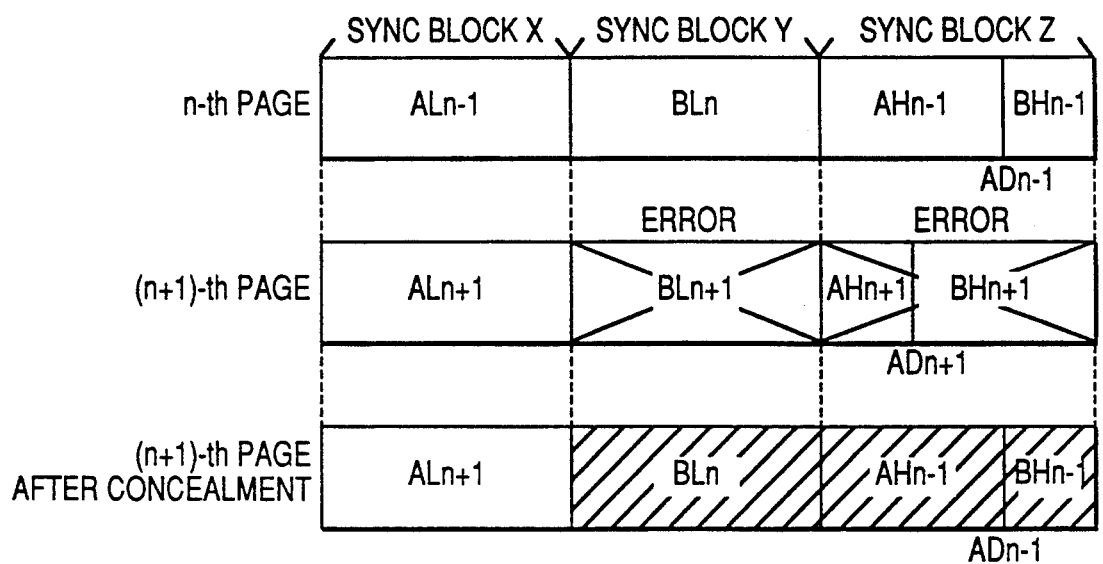

FIG. 11 illustrates an error concealing method according to a sixth embodiment of this invention. In this embodiment, explanations will be made on the concealment in a high speed play. During reproduction at high speed, a head traces across a plurality of tracks, so that the number of sync blocks to be reproduced properly will be small. As a result, it is required to use the data of the sync blocks which are reproduced properly in order to improve the image quality. As explained above, the sync block is constructed such that one recording block is delimited into the low frequency component range and high frequency component range, so that when reproduced at high speed, if the sync blocks (sync block X and sync block Y) including the low frequency component are reproduced properly, an image on the screen can be reproduced with the low frequency component only. FIG. 11(a) shows a case when an error exists in the sync block $X_{n+1}$, and the data $AL_{n+1}$ of the sync block $X_{n+1}$ is substituted with the data $AL_n$ of the sync block $X_n$. In addition, FIG. 11(b) shows a case when errors exist in the sync blocks $X_{n+1}$ and $Z_{n+1}$, and the data $AL_{n+1}$ of the sync block $X_{n+1}$ is substituted with the data $AL_n$ of the sync block $X_n$ and the data $AH_{n+1}$ of the sync block $Z_{n+1}$ is substituted with the data $AH_n$ of the sync block $Z_n$.

Here, since such a case is occurred in reproducing at high speed that an image on the screen is reproduced with the low frequency component data only, an decoding information of each recording unit after concealment is defined as two bits as shown in Table 1. In the bit rate reduction decoding section, each recording unit is decoded based on the decoding information shown in Table 1.

TABLE 1

| Decoding information | Decoding method of bit rate reduction decoding section |
| --- | --- |
| (0, 0) | All the data of sync block Z are decoded |
| (1, 0) | Only the high frequency component of the data A of sync block Z is concealed |
| (0, 1) | Only the high frequency component of the data B of sync block Z is concealed |
| (1, 1) | The data of sync block Z is not decoded |

Figure 12:
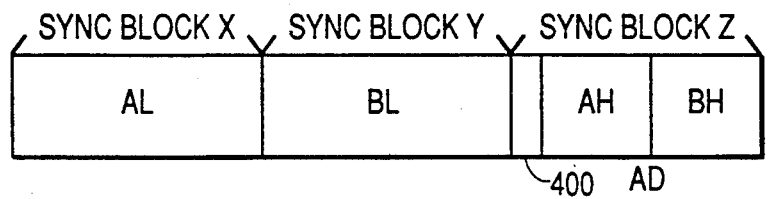
FIG. 12 is an explanatory drawing of a method of multiplexing a concealed information.

For example, in FIG. 11(a), the data $AH_{n+1}$ is not to be decoded, and the decoding information is set as (0, 1). Also, in FIG. 11(b), the data $BH_n$ is not to be decoded, and the decoding information is set as (1, 0). And, if a decoding information 400 is multiplexed in each recording block as shown in FIG. 12 similar to the concealing information shown in the fifth embodiment, the decoding can be properly made in the bit rate reduction decoding section. In addition, the decoding information after concealment is determined based on the error position in the current page and the decoding information of one page before. For example, in FIG. 11(c), the sync blocks $Y_{n+1}$ and $Z_{n+1}$ are concealed in the current page, and on the other hand, the decoding information of one page before is (1, 0), so that (1, 1) is set as the decoding information after concealment.

As explained above, the image on the screen can be made of the sync blocks including the low frequency component data reproduced when reproducing at high speed. Also, by defining the decoding information, the data can be properly decoded in the bit rate reduction decoding section.

Figure 13:
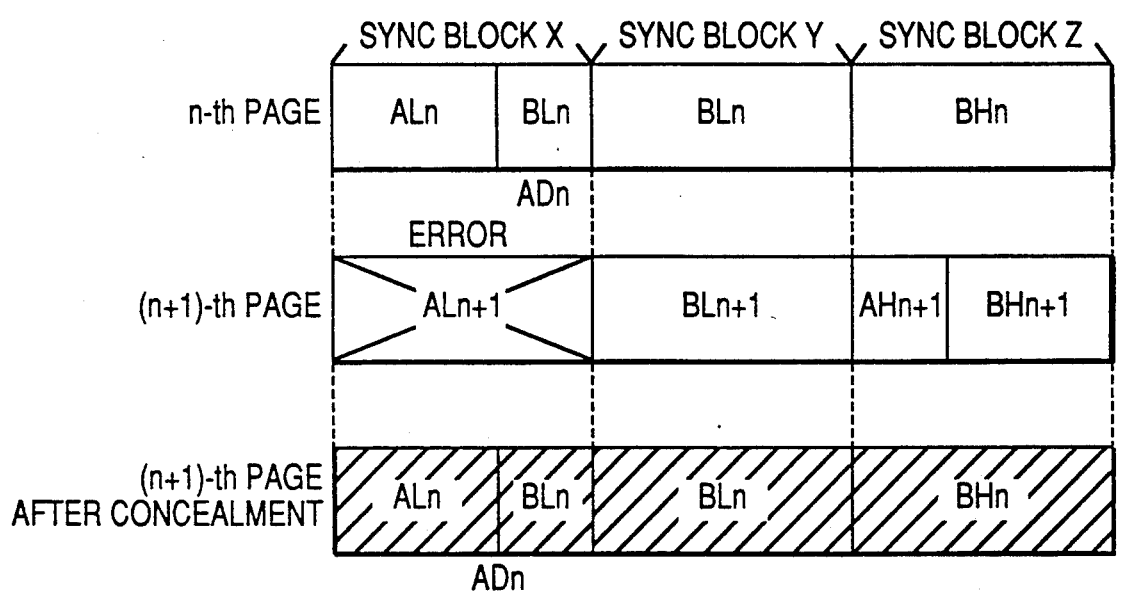
FIG. 13 is an explanatory drawing of an error concealing method in a case where a recording unit has a special construction.

In addition, the above-described embodiments show such a case that the sync block Z consists of the data A and data B, however, in case the data A and B are largely different in data amount from each other, for example, in case that the data amount of the data A is smaller than the data amount insertable into the sync block X as shown in FIG. 13, a part of the data B is inserted into the remaining range of the sync block X, and the sync block Z is made entirely of the data B. In such case, it is difficult to conceal the data A only, so that the whole of the recording unit is concealed.

What is claimed is:

1. A method of concealing a record unit of coded video data which has been reproduced from a recording medium and has a first recording block containing a part of a coded video data A which has been obtained by coding m blocks of video data among a plurality of blocks of video data divided from video data of one page, a second recording block containing a part of a coded video data B which has been obtained by coding other m blocks of video data among said plurality of blocks of video data and a third recording block containing in a first part thereof the remaining part of said coded video data A and in a second part thereof the remaining part of said coded video data B, said record unit also containing an address data indicating an address of a border of said first and second parts of said third recording block, said method comprising the steps of:

detecting an error position where an error of coded video data exists in said record unit;
   detecting said address data contained in said record unit;

comparing the detected address data with an address data contained in a corresponding record unit of a previous page;

determining which part of said record unit should be replaced by a corresponding part of said corresponding record unit of said previous page according to said error position and a comparison result of said comparing step; and replacing the part of said record unit determined in said determining step by a corresponding part of said corresponding record unit of said previous page to thereby conceal said record unit.

2. A method according to claim 1, wherein the address data of said record unit after being concealed is replaced by the address data of said corresponding record unit of said previous page.

3. A method according to claim 1, wherein the address data of said record unit after being concealed is selected from the address data before being concealed and the address data of said corresponding record unit of said previous page depending on said error position.

4. A method according to claim 1, wherein said comparing step produces a difference between said detected address data of said record unit and said address data of said corresponding record unit of said previous page, and said determining step determines which part of said record unit should be replaced by a corresponding part of said corresponding record unit of said previous page according to said difference.

5. A method according to claim 1, wherein, when said error position includes a position where said address data is contained, said determining step determines to replace said record unit entirely by said corresponding part of said corresponding record unit of said previous page, and said replacing step replaces said record unit entirely by said corresponding record unit of said previous page.

6. A method according to claim 1, further comprising a step of inserting into said record unit after being concealed a concealment data indicating that said record unit has been concealed.

7. A method according to claim 6, wherein said determining step includes a step of checking said concealment data contained in said record unit and in said corresponding record unit of said previous page, and, when at least one of said record unit and said corresponding record unit of said previous page is a record unit which has been concealed, said determining step determines to replace said record unit entirely by said corresponding part of said corresponding record unit of said previous page, and said replacing step replaces said record unit entirely by said corresponding record unit of said previous page.

8. A method according to claim 1, further comprising a step of inserting into said record unit after being concealed a decoding data indicating a part of said record unit which should be decoded and a part of said record unit which should not be decode.

9. A method of concealing a record unit of coded video data which has been reproduced from a recording medium and has sequentially arranged first recording block containing low frequency components of a coded video data A which has been obtained by coding m blocks of video data among a plurality of blocks of video data divided from video data of one page, second recording block containing low frequency components of a coded video data B which has been obtained by coding other m blocks of video data among said plurality of blocks of video data and third recording block containing in a first part thereof high frequency components of said coded video data A and in a second part thereof high frequency components of said coded video data B, said record unit also containing an address data indicating an address of a border of said first and second parts of said third recording block, said method comprising the steps of:

detecting an error position where an error of coded video data exists in said record unit;

detecting said address data contained in said record unit;

comparing the detected address data with an address data contained in a corresponding record unit of a previous page;

determining which part of said record unit should be replaced by a corresponding part of said corresponding record unit of said previous page according to said error position and a comparison result of said comparing step; and replacing the part of said record unit determined in said determining step by a corresponding part of said corresponding record unit of said previous page to thereby conceal said record unit.

10. A method according to claim 9, wherein the address data of said record unit after being concealed is replaced by the address data of said corresponding record unit of said previous page.

11. A method according to claim 9, wherein the address data of said record unit after being concealed is selected from the address data before being concealed and the address data of said corresponding record unit of said previous page depending on said error position.

12. A method according to claim 9, wherein said comparing step produces a difference between said detected address data of said record unit and said address data of said corresponding record unit of said previous page, and said determining step determines which part of said record unit should be replaced by a corresponding part of said corresponding record unit of said previous page according to said difference.

13. A method according to claim 9, wherein, when said error position includes a position where said address data is contained, said determining step determines to replace said record unit entirely by said corresponding part of said corresponding record unit of said previous page, and said replacing step replaces said record unit entirely by said corresponding record unit of said previous page.

14. A method according to claim 9, further comprising a step of inserting into said record unit after being concealed a concealment data indicating that said record unit has been concealed.

15. A method according to claim 14, wherein said determining step includes a step of checking said concealment data contained in said record unit and in said corresponding record unit of said previous page, and, when at least one of said record unit and said corresponding record unit of said previous page is a record unit which has been concealed, said determining step determines to replace said record unit entirely by said corresponding part of said corresponding record unit of said previous page, and said replacing step replaces said record unit entirely by said corresponding record unit of said previous page.

16. A method according to claim 9, further comprising a step of inserting into said record unit after being concealed a decoding data indicating a part of said record unit which should be decoded and a part of said record unit which should not be decoded.

* * * * *